UNITED STATES PATENT OFFICE.

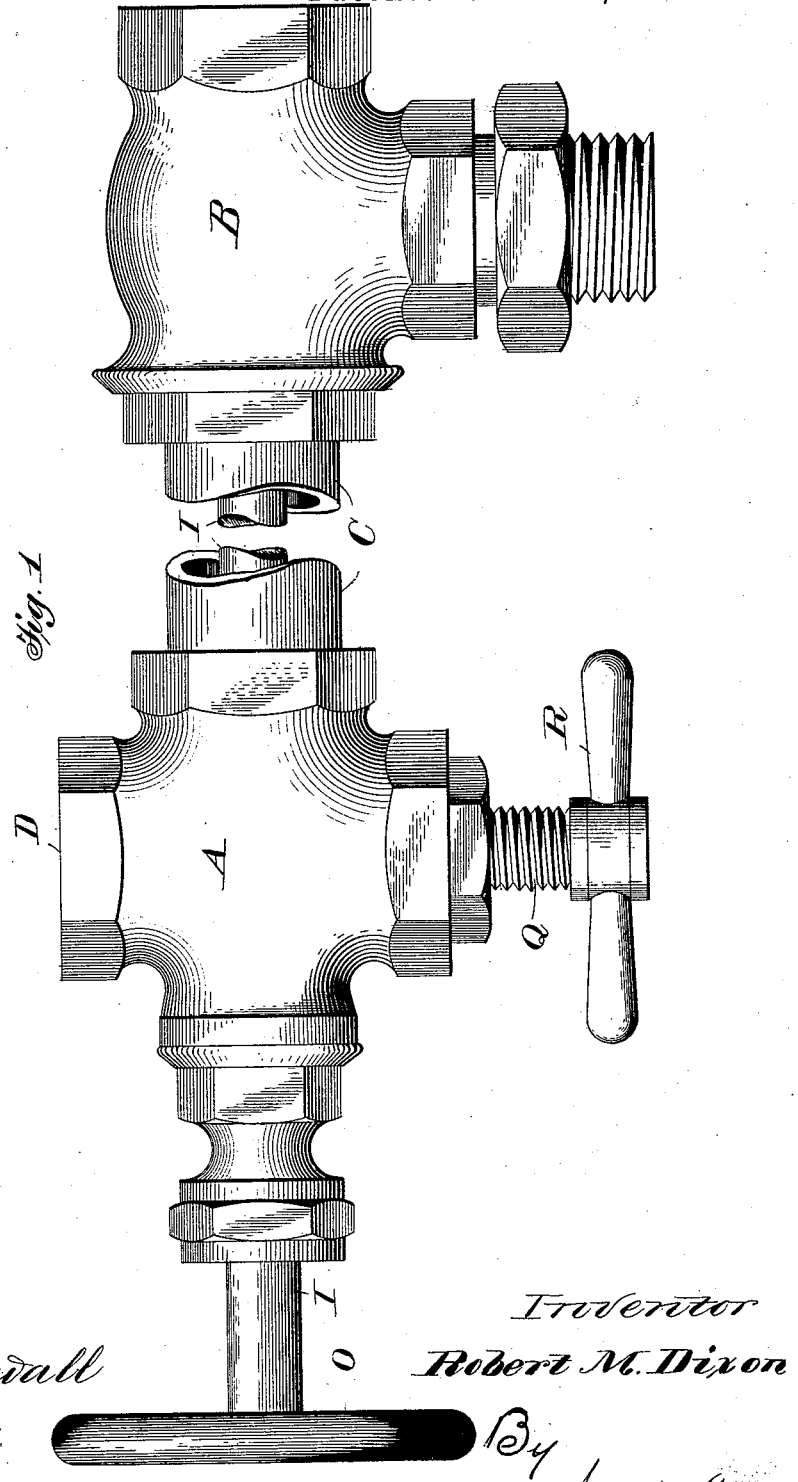

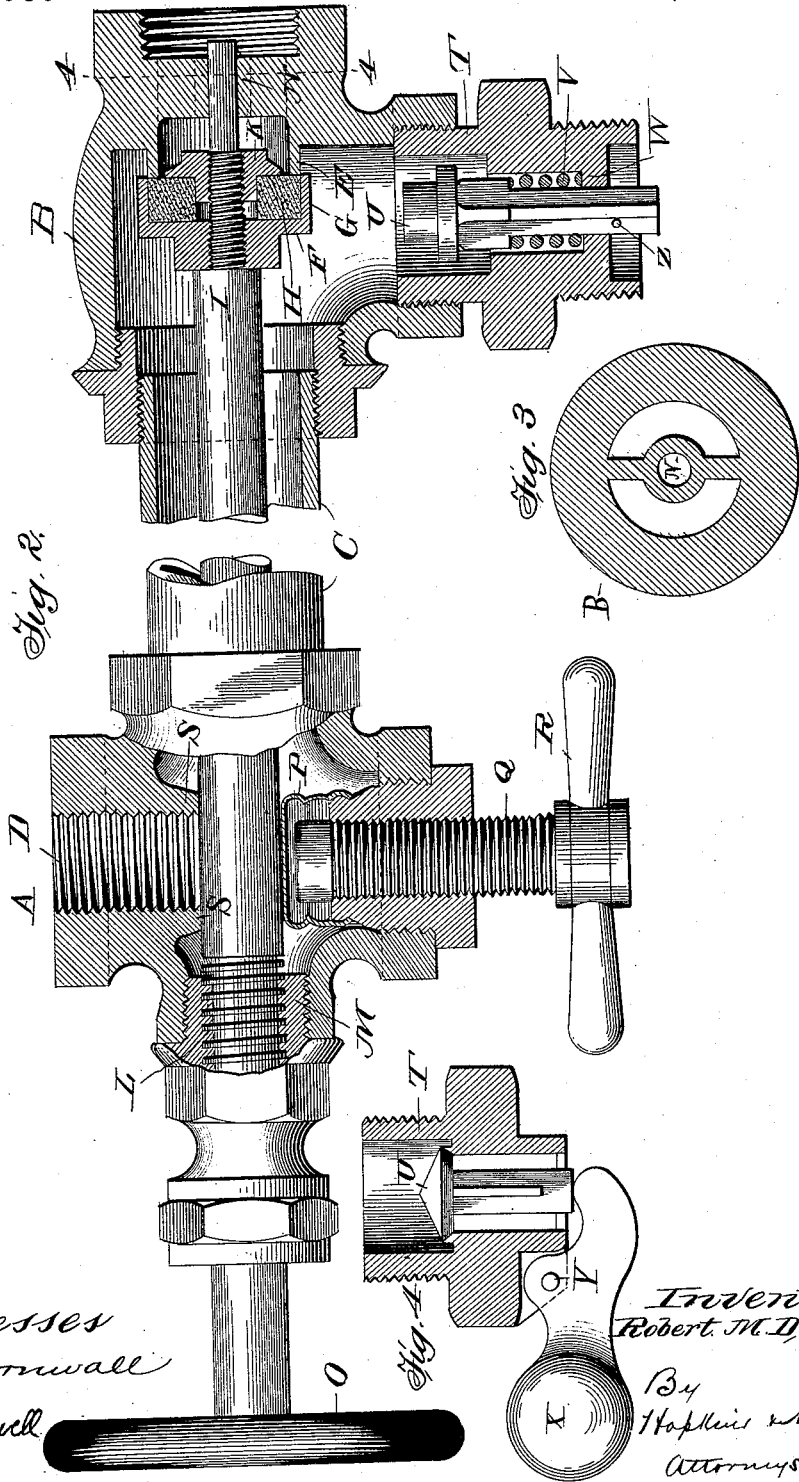

ROBERT M. DIXON, OF EAST ORANGE, NEW JERSEY, ASSIGNOR TO THE SAFETY CAR HEATING AND LIGHTING COMPANY, OF NEW YORK.

STEAM-TRAP.

SPECIFICATION forming part of Letters Patent No. 477,855, dated June 28, 1892.

Application filed September 9, 1891. Serial No. 405,202. (No model.)

*To all whom it may concern:*

Be it known that I, ROBERT M. DIXON, of East Orange, in the county of Essex and State of New Jersey, have invented certain new and useful Improvements in Steam-Traps, of which the following is a specification, reference being had to the accompanying drawings.

The object of my invention is to produce an automatic trap for carrying off the water of condensation as it accumulates in a system of steam-pipes without allowing waste of steam.

My trap is specially adapted for use in steam-heating systems for railroad-cars, in which it is desirable to constantly drain off the water of condensation in the pipes.

In the accompanying drawings, Figure 1 is a side elevation of my device. Fig. 2 is a similar view partly in section. Fig. 3 is a section on the line 4 4 of Fig. 2. Fig. 4 is a view, partly in section, of a modified form of check-valve.

Referring to the letters on the drawings, A indicates a head-piece or shell, and B the valve-case, which are united by a tube C to constitute my trap. The head-piece would be in use united to a system of steam-pipes by the internally-screw-threaded opening D, through which water of condensation from the system may enter the trap. In systems of steam-heating, especially on railroad-cars, provision is usually made for drainage to one point, and to that the trap may be connected. The valve-case would also be in use carried on a lower level than the head-piece, so that the trap would carry the water toward the valve-case.

E indicates a circular valve-seat adapted to be opened and closed by the movement of the valve F. This valve may be composed of a recessed head G, that carries within its recess an elastic bearing-piece H, both being fastened to the screw-threaded end of the rod or stem I by the nut K. The stem is carried rigidly in screw-threaded bearings L in the bushing M of the head-piece and in the smooth bearing N in the valve-case. It is provided with external screw-threads to fit the bearings L, with a spindle end to fit the bearing N, and also with a handle O for turning and imparting longitudinal motion to it within the trap. To render the action of the trap automatic, the stem should be made of material which is subject to considerable contraction and expansion under different degrees of heat and will contract more under a reduction of temperature than the tube C, which is also subject to similar influences.

P indicates a somewhat flexible or elastic metallic plate or thimble fastened in one side of the head-piece by a bushing, so as to form a steam-tight joint. The bushing is adapted to carry in a suitably-threaded opening the abutment-screw Q, which may be operated by a handle R.

S indicates jaws in the head-piece opposite to the screw Q, between which the stem I may be locked as in a vise.

To render the above-described trap automatically operative, suppose the pipes it is intended to drain to be filled with steam, the valve F being separated from its seat to allow its escape. When the temperature of the tube C and stem I has been raised to, say, 212° Fahrenheit, the stem should be turned until the valve F is pressed against its seat so as just to prevent the escape of steam. The screw Q should then be screwed against the end of the thimble P, so as to grip the stem between the thimble and jaws S to lock it in place. As the water of condensation accumulates it will reduce the temperature of the trap and contract the metal of which it is constructed. By reason of the relative qualities of the metals which compose the tube C and stem I the latter will contract more than the former and separate the valve F and seat. Thereupon the steam will blow out the accumulated water until by the raising of the temperature the valve is again closed. If after the parts have been adjusted, as above stated, to suit a temperature of 212° the temperature should rise higher, there would be a tendency of the parts of the valve to close tighter and damage or strain them. To avoid this difficulty, I have provided the elastic bearing-piece H. When steam is shut off from a heating system, the discharge of water by the above-described means would be slow and danger of freezing in cold latitudes would ensue. I have therefore provided in the bottom of the case B an auxiliary valve, which may consist of a body T, screwed into the case and provided with a balanced check-valve U, adjusted to close under certain steam-pressure and to open when that is reduced. To so balance the valve, I may, for instance, employ a coiled spring V, seated at one end on a shoulder W in the body and bearing at its other end against the head of the valve, or a weighted lever X, pivoted at Y to the body and bearing against the bottom of the valve. With the spring-balanced valve a suitable retaining device—such as a pin Z—may be used to limit its upward motion. In cold weather, when condensation would be rapid if only a check-valve were used, there might be a sufficient accumulation of water in the trap after a car was cut off from the boiler to freeze before the steam-pressure would be sufficiently reduced to allow the check-valve to open. When combined with the main valve, however, this cannot occur, as it will keep the trap drained as long as there is sufficient steam-pressure to close the auxiliary valve.

While it is necessary, as above described, to open the trap in order to adjust it to the heat of steam for automatic operation, after the adjustment has once been effected the cars which constitute the different members of a heating system may be coupled and uncoupled at will without attention to the traps. The valves therefore in use after the first adjustment had been made would be normally closed.

What I claim is—

1. A steam-trap having a valve adapted to automatically operate by expansion and contraction under changes of temperature and an auxiliary valve adapted to close under pressure of steam and to open when pressure is relieved, substantially as set forth.

2. A steam-trap having a horizontally-opening valve adapted to be operated by expansion and contraction under changes of temperature and a vertically-opening auxiliary valve adapted to close under pressure of steam and to open when pressure is relieved, substantially as set forth.

3. In a trap, the combination, with a movable part and shell, of a flexible plate tightly fitted in the shell and a screw suitably carried therein above the plate to grip the movable part through the plate, substantially as set forth.

In testimony of all which I have hereunto subscribed my name.

ROBERT M. DIXON.

Witnesses:
JOHN T. CLARK,
WM. P. WRIGHT.